(12) United States Patent
Bent et al.

(10) Patent No.: US 11,579,771 B2
(45) Date of Patent: Feb. 14, 2023

(54) DATA STORAGE LAYOUTS

(71) Applicant: Seagate Technology LLC, Fremont, CA (US)

(72) Inventors: John Michael Bent, Los Alamos, NM (US); Nikita Danilov, Moscow (RU); Kenneth K. Claffey, Shakopee, MN (US); Raj Bahadur Das, Redwood City, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/101,797

(22) Filed: Nov. 23, 2020

(65) Prior Publication Data

US 2021/0357121 A1 Nov. 18, 2021

(51) Int. Cl.
*G06F 3/06* (2006.01)

(52) U.S. Cl.
CPC .......... *G06F 3/0604* (2013.01); *G06F 3/0643* (2013.01); *G06F 3/0673* (2013.01)

(58) Field of Classification Search
CPC ..... G06F 3/0604; G06F 3/0643; G06F 3/0673
See application file for complete search history.

(56) References Cited

U.S. PATENT DOCUMENTS

| | | | |
|---|---|---|---|
| 5,963,962 A | 10/1999 | Hitz et al. | |
| 6,874,061 B1 | 3/2005 | Bridge | |
| 6,976,060 B2 | 12/2005 | Manczak et al. | |
| 6,988,179 B2 | 1/2006 | Bolik et al. | |
| 7,299,325 B1 | 11/2007 | Waterhouse et al. | |
| 7,403,987 B1 | 7/2008 | Marinelli et al. | |
| 7,409,494 B2 | 8/2008 | Edwards et al. | |
| 7,430,571 B2 | 9/2008 | Edwards | |
| 7,506,101 B2 | 3/2009 | Liu et al. | |
| 7,539,709 B1 | 5/2009 | Vengerov et al. | |
| 7,730,171 B2 | 6/2010 | Frazier et al. | |
| 7,873,596 B2 | 1/2011 | Pudipeddi et al. | |
| 8,392,370 B1 | 3/2013 | Whitney et al. | |
| 8,433,685 B2 | 4/2013 | Hayden et al. | |
| 8,443,153 B1 | 5/2013 | Edwards et al. | |
| 8,555,022 B1 | 10/2013 | Edwards et al. | |
| 8,572,346 B2 | 10/2013 | Naganuma et al. | |
| 8,700,683 B2 | 4/2014 | Cooney et al. | |
| 8,732,518 B2 | 5/2014 | Storer et al. | |
| 8,793,466 B2 | 7/2014 | Shao et al. | |
| 8,825,963 B1 | 9/2014 | Edwards et al. | |
| 8,850,130 B1 | 9/2014 | Aron et al. | |
| 9,026,705 B2 | 5/2015 | Feehrer et al. | |
| 9,026,765 B1 | 5/2015 | Marshak et al. | |
| 9,032,164 B2 | 5/2015 | Rupanagunta et al. | |
| 9,298,604 B2 | 3/2016 | Sengupta et al. | |
| 9,348,858 B2 | 5/2016 | Efrati et al. | |
| 9,395,937 B1 | 7/2016 | Si et al. | |
| 9,430,390 B2 | 8/2016 | Mukherjee et al. | |
| 9,436,571 B2 | 9/2016 | Slik | |

(Continued)

*Primary Examiner* — Edward J Dudek, Jr.
(74) *Attorney, Agent, or Firm* — Mueting Raasch Group

(57) ABSTRACT

A composite layout to store one or more extents of a data object in a first storage system and one or more extents of the data object in a second, different storage system. The first storage system may be configured for the efficient storage of small chunks of data such as, e.g., chunks of data small than the addressable block size of the storage devices used by the storage systems.

20 Claims, 6 Drawing Sheets

(56) References Cited

U.S. PATENT DOCUMENTS

| | | |
|---|---|---|
| 9,477,431 B1 | 10/2016 | Chen et al. |
| 9,600,559 B2 | 3/2017 | Xue |
| 9,658,781 B2 | 5/2017 | Dolph et al. |
| 9,665,427 B2 | 5/2017 | Benight et al. |
| 9,765,925 B2 | 9/2017 | Lewis |
| 10,248,556 B2 | 4/2019 | Barrus |
| 10,261,717 B1 | 4/2019 | Martin et al. |
| 10,623,485 B2 | 4/2020 | Braam et al. |
| 2013/0185503 A1 | 7/2013 | Bhatta |
| 2016/0210306 A1 | 7/2016 | Kumarasamy et al. |
| 2017/0206212 A1 | 7/2017 | Srivilliputtur Mannarswamy et al. |
| 2017/0323028 A1 | 11/2017 | Jonker et al. |
| 2018/0232282 A1 | 8/2018 | Danilov et al. |
| 2019/0012336 A1* | 1/2019 | Schreter .............. G06F 11/1471 |
| 2021/0216517 A1* | 7/2021 | Graefe ................ G06F 16/2246 |

\* cited by examiner

DATA STORAGE LAYOUTS

The disclosure herein relates to data storage layouts configured to store one or more extents of a data object into a first storage system (e.g., a key-value storage system) and one or more extents of the data object into a second storage system different that the first storage system so as to, for example, handle small data files or small data objects.

SUMMARY

One illustrative system may include one or more data storage apparatuses to store one or more data objects; and computing apparatus comprising one or more processors and operably coupled to the one or more data storage apparatuses. The computing apparatus may be configured to maintain, using the one or more data storage apparatuses, a key-value storage system and another storage system different than the key-value storage system and provide a composite layout for each data object stored on the one or more data storage apparatuses. The composite layout may include mapping information linking one or more extents of each data object to one or more locations on the one or more data storage apparatuses where the one or more extents of the data object are stored. At least one extent of the one or more extents of each data object may be stored in the key-value storage system and at least another extent of the one or more extents of each data object may be stored in the another storage system.

One illustrative method may include maintaining, using the one or more data storage apparatuses to store one or more data objects, a key-value storage system and another storage system different than the key-value storage system. The illustrative method may further include providing a composite layout for each data object stored on the one or more data storage apparatuses. The composite layout may include mapping information linking one or more extents of each data object to one or more locations on the one or more data storage apparatuses where the one or more extents of the data object are stored. At least one extent of the one or more extents of each data object may be stored in the key-value storage system and at least another extent of the one or more extents of each data object may be stored in the another storage system.

One illustrative composite layout corresponding to a data object describing one or more locations of one or more extents of the data object on one or more storage apparatuses may include a plurality of sub-layouts ranked from a lowest priority to a highest priority, and each sub-layout may include mapping information linking one or more extents of the data object to one or more locations on the storage apparatuses where the one or more extents of the data object are stored. At least one extent of the one or more extents of each data object may be stored in a key-value storage system and at least another extent of the one or more extents of each data object may be stored in another storage system different than the key-value storage system.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

The present disclosure is related to systems, methods, and processes utilizing file system data location lookup in dynamic environments. As further described herein, the exemplary systems, methods, and processes may reduce the computational complexity of describing file data location in a dynamic environment and enable a range of layout-related file system features using a common descriptive format and a minimized code path. Generally, systems, methods, and processes may utilize, or include, exemplary composite layouts with a set of useful properties and/or mechanisms associated therewith. For example, the illustrative composite layout described herein may be configured to provide certain functionality to handle small files or small data objects in a space efficient manner. As will be further described, one or more extents of each data object may be stored in a first storage system, such as a key-value storage system, while any remaining extents may be stored in a second storage system, such a more traditional storage system.

In at least one embodiment, a first, or initial, extent, of each data object may be stored in a first storage system, such as a key-value storage system, while any remaining extents may be stored in a second storage system, such a more traditional storage system. Any writes or reads from the first extent will be directed to the first storage system (e.g., a key-value storage system).

Further, for example, the illustrative composite layout may include, or be composed, of a set of sub-layouts. The sub-layouts may occupy a particular ordered rank in the composite layout or structure. New writes may be directed to the highest-ranked sub-layout, and reads are may be directed to the highest-ranked simple layout that has a mapped extent for the file range requested. In at least one embodiment, one of the sub-layouts may correspond to only the extents stored in the first storage system (e.g., a key-value storage system).

Figure 1:
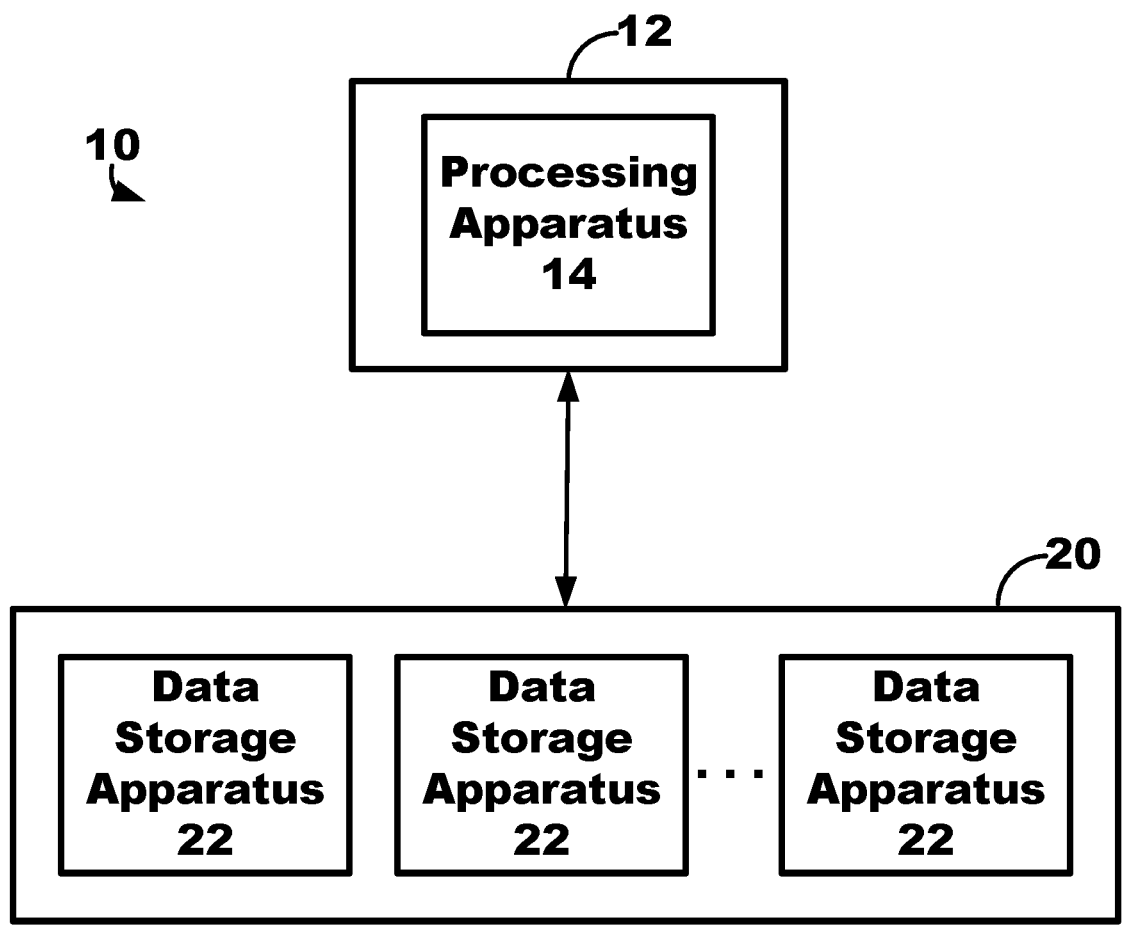
FIG. 1 is a block diagram of an exemplary system including a file system for storing data objects.

An exemplary system 10 for storing data objects is depicted in FIG. 1. The system 10 includes a host device 12 (such as, e.g., a personal computer, server, etc.) and a data storage system 20. The host device 12 may be operably coupled to the data storage system 20 to read and write data objects or files from and to the data storage system 20. Although a single host device is depicted, it is to be understood that the system 10 may include a plurality of host devices 12 operably coupled to the data storage system 20. Additionally, the data storage system 20 itself may include one or more computing apparatuses to provide functionality provided by the data storage system 20. More specifically, the one or more computing apparatuses of the data storage system 20 may include one or more processors, processing circuitry, memory, etc. configured to provide the reading and writing of one or more data objects (e.g., including files) from the data storage system 20 and the one or more mechanisms and processes associated with the exemplary composite layouts described herein. For example, the host device 12 may request data from a data object from the data storage system 20, and the data storage system 20 may return the requested data of the data object. Further, for example, the host device 12 may attempt to write data to a data object of the data storage system 20, and the data storage system 20 may facilitate the writing of the data to the data object.

As shown, the data storage system 20 includes a plurality of data storage apparatuses 22 for storing the data objects. The data storage apparatus 22 may include any device and/or apparatus configured to store data (e.g., binary data, etc.). The data storage apparatuses 22 can include, but is not necessarily limited to, solid state memory, hard magnetic discs, magnetic tapes, optical discs, integrated circuits, volatile memory, nonvolatile memory, and any combination thereof. Further, each data storage apparatus 22 may be an array of storage devices such as, e.g., a RAID (redundant array of inexpensive disks) storage arrangement. Each data storage apparatus 22 may be a server or virtual server. It is to be understood that this disclosure is not be limited to the system 10 depicted in FIG. 1, and instead, the system 10 is only one illustrative configuration. For example, the data storage system 20 may include one or more of a local filesystem, a storage area network (SAN) file system, a distributed file system, a parallel file system, a virtual file system, and/or combinations thereof.

The data storage system 20 may be further described as a system designed to provide computer application programs on the host 12 with access to data stored on the data storage devices 22 in a logical, coherent way. Further, the data storage system 20 may be described as hiding the details of how data is stored on data storage devices 22 from the host 12 and application programs running on the host 12. For instance, the data storage devices 22 may be generally block addressable, in that data is addressed with the smallest granularity of one block, and multiple, contiguous data portions or chunks may define, or form, an extent. An extent may be defined as a portion of data within a data object or file. In other words, an extent may be described as a range of bytes within the data object or file. The size of a particular extent, e.g., 512 bytes in length, 1024 kilobytes in length, 4096 kilobytes in length, etc. may depend upon the type and size of the data storage apparatus 22. Application programs on the host 12 may request data from data storage system 20, and the data storage system 20 may be responsible for seamlessly mapping between application logical extents within a data object and physical space on data storage apparatus 22.

Existing file systems have used various methods to provide such mapping. For example, filesystems may use mapping information or meta data according to a layout to provide data location on data storage apparatuses 22 via lookup (e.g., extent lists in an i-node in the case of a local filesystem such as the EXT4 file system, or a set of object/server pairs in a distributed system such as LUSTRE file system) or formulaically (e.g., parameters to a SWIFT ring). These existing file systems may suffer from an assumption that the layout remains mostly static. For example, modifying some or all of the data layout may typically either completely rewrite lookup information or move the data itself to accommodate new parameters.

A layout may be defined as a description of where in a file system a particular set of data, for example, a file or data object, is located. As noted herein, an extent may be defined as a portion of data within a data object or file. The term "FID" is used throughout this disclosure to mean a "File Identifier," which may be used as a handle, or descriptor, to reference a layout for a particular file. For some types of layouts, an FID may point to some metadata describing a layout formula and parameters to this formula for a series of extents in the file. Further, other types of layout mapping functions such as block bitmaps or extent lists may be used as well.

Figure 2:
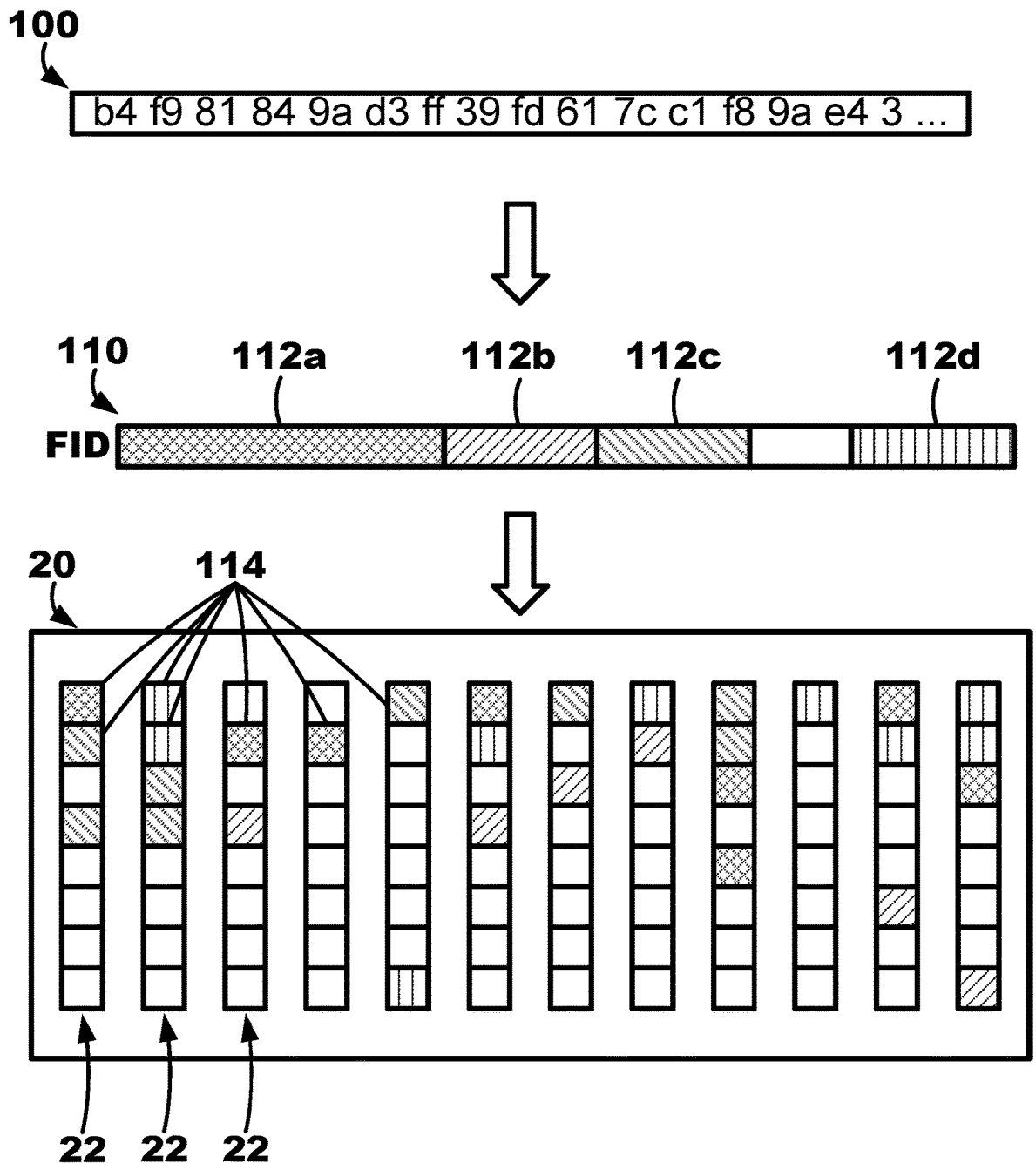
FIG. 2 is a diagrammatic representation of a "simple" layout corresponding to a data object for use with an exemplary system such as, e.g., depicted in FIG. 1.

A diagrammatic representation of a simple layout 110 referenced as FID corresponding to a data object, or file, 100 for use with an exemplary system is depicted in FIG. 2. The data object, or file, 100 is diagrammatically represented as a string of hexadecimal bytes. The layout 110 may correspond to the data object 100 such that the layout 110 extends from a left end to a right end representing the range of bytes within the data object 100 with the left end representing the beginning of the data object 100 and the right end representing the end of the data object 100. The layout 110 may include mapping information represented by hatching in FIG. 2 linking various extents 112 of the data object 100 to one or more locations 114 on the one or more storage apparatuses 22. The hatching of mapping information within the layout 110 corresponds to the size and location of the extent within the data object 100. In other words, the layout 110 may correspond to the data object 100 in that it describes where various extents 112 of the data object 100 are stored, or located, on the one or more storage apparatuses 22.

The extents 112 are depicted diagrammatically using hatching within the layout FID 110 of FIG. 2 to indicate which extents, or ranges, of the data object 100 include data, and thus, which extents have corresponding mapping information in the layout 110. For example, the hatched extents 112, or areas, of the layout 110 indicate that mapping information exists to link the extents 112 to the locations 114.

When data is to be written to the data object 100 or read from the data object 100 (e.g., by the host 12), the exemplary system may utilize a layout function to determine the mapping information for the data to be written to or read from the data object 100 from the layout 110. If new data is to be written to a portion, or section, of the data object 100, the layout function may determine the extents 112 where such portions, or sections, of the data object 100 reside within the file system 22 (e.g., on which storage apparatus 22, where within the storage apparatuses 22, etc.) based on the mapping information within the layout 110, and then such extents 112 or portions thereof of the data storage apparatuses 22 may be overwritten with the new data. If new data is to be read from a portion, or section, of the data object 100, the layout function may determine the extents 112 where such portions, or sections, of the data object 100 resides on the one or more storage apparatuses 22 based on the mapping information within the layout 110, and then such extents 112 or portions thereof of the data storage apparatuses 22 may be read.

The layout 110 shown with respect to FIG. 2 may be described as being a "simple" layout because the "simple" layout may not include mapping information linking any extents to alternative storage systems like a key-value storage system. Instead, the layout 110 may merely include mapping information linking each extent 112 to various locations of the data storage apparatuses 22 without providing any flexibility to the storage systems or scheme therebetween, which may lead to issues with storage of very small files.

It is desirable to more efficiently store very small files, which may be common in machine learning and artificial intelligent applications. For example, storing a small file by itself into a 4K (4096 kilobytes) disk block is often extremely inefficient in many file systems because no matter how small the file is, the file will take an entire 4k disk block for storage. In other words, although a small file may be 100 kilobytes, it may take the entire 4096 kilobytes of the 4k disk block in many file systems. Additionally, if the file system creates an i-node for each 100-kilobyte file, then the i-node (likely 1,024 kilobytes in length) will also take another 4K disk block. In one instance, if 50% of the files stored in a 4K block storage system are 100 bytes, then the system may experience up to 40 times loss in usable capacity. Thus, for example, if a small portion of data were stored in an empty file object according the layout 110, even though portion of data were small, it would consume the entire first extent, such as a 4K block, which is mapped to various locations on the data storage apparatuses 22.

To resolve these issues, the illustrative systems and methods may store the first extent (such as, e.g., the first 4K block) of every file into a first storage system for optimizing storage of small files such as, e.g., a key-value storage system, using a composite layout as will be described further herein with reface to FIGS. 3-4. While previous systems and methods, for example, may utilize 80 terabytes to store 1 terabyte of 100-byte files, the illustrative systems and methods may utilize just 11 terabytes—significantly less space than the 80 terabytes of the previous systems and methods.

Additionally, one or more extents of a data object may be frequently used, and thus, it may beneficial for such extents to be located on a storage system that is faster than other available storage systems. Also, one or more extents of a data object may be determined to more critical than other extents, and thus, it may beneficial for such extents to be located on a storage system that is more reliable, more fault tolerant, and/or includes better redundancy and error correction than other available storage systems. To resolve these issues, the illustrative systems and methods may store frequently-used and/or critical extents of data objects into the first storage system such as, e.g., a key-value storage system, to increase the speed of storage modification, and retrieval of such extents, and to increase the reliability, fault tolerance, redundancy, and error correction of such extents, using a composite layout as will be described further herein with reference to FIGS. 3-4.

The illustrative systems and methods described herein may include composite layouts that are configured, or adapted, to handle small files and/or object compaction. Further, the illustrative systems and methods may be described as combining use of multiple types of storage systems (such as a key-value storage) and composite layouts to ensure the efficient packaging of small file data, e.g., into the smallest possible number of disk blocks. Thus, the illustrative systems and methods described herein may be able to store a large number of small files efficiently into disks.

It may be described that the illustrative composite layouts can easily allow storing the "heads" of files into a first storage system such as, e.g., a key-value storage system or volume, which may automatically use log-structured merge tree streaming b-tree mechanisms for efficient packing of small data. Further, it may be described that the illustrative systems and methods may provide integrated storage systems that supports objects, files, and key-value pairs. In one or more embodiments, key-value storage may be implemented as a streaming B-tree such that small key-value pairs may be automatically coalesced into 4K blocks. Still further, it may be described that the illustrative systems and methods utilize key-value storage and composite layouts such that small files and their i-nodes are transparently stored efficiently in the key-value storage.

Further, the layout 110 shown with respect to FIG. 2 may be described as being a "simple" layout because the "simple" layout cannot represent more than one location on storage apparatuses for any overlapping extent ranges. For example, extent 112a and extent 112b in FIG. 2 cannot overlap because the location of any portion of the data object 100 in the intersection could not be resolved uniquely. Other storage systems may internally map an extent to multiple locations for data redundancy purposes. For example, an extent may be mapped to a pair of locations in a RAID1 configuration, where data is written to two physical devices and may be read from either one in case of a failure. More complex, yet fully resolvable schemes may be used as well, for example RAID6 or erasure coding schemes. However, these simple layouts used by themselves or in conjunction with RAID configuration layouts remain statically fixed over time. Generally repairing RAID data by incorporating new devices or changing the desired location of a file involve wholesale movement of all the mapped extents of a file into a new static layout. In such cases these systems may temporarily hold two layouts for a file, the original and the new one, while such data migration (data copy to a new location) is taking place.

Figure 3:
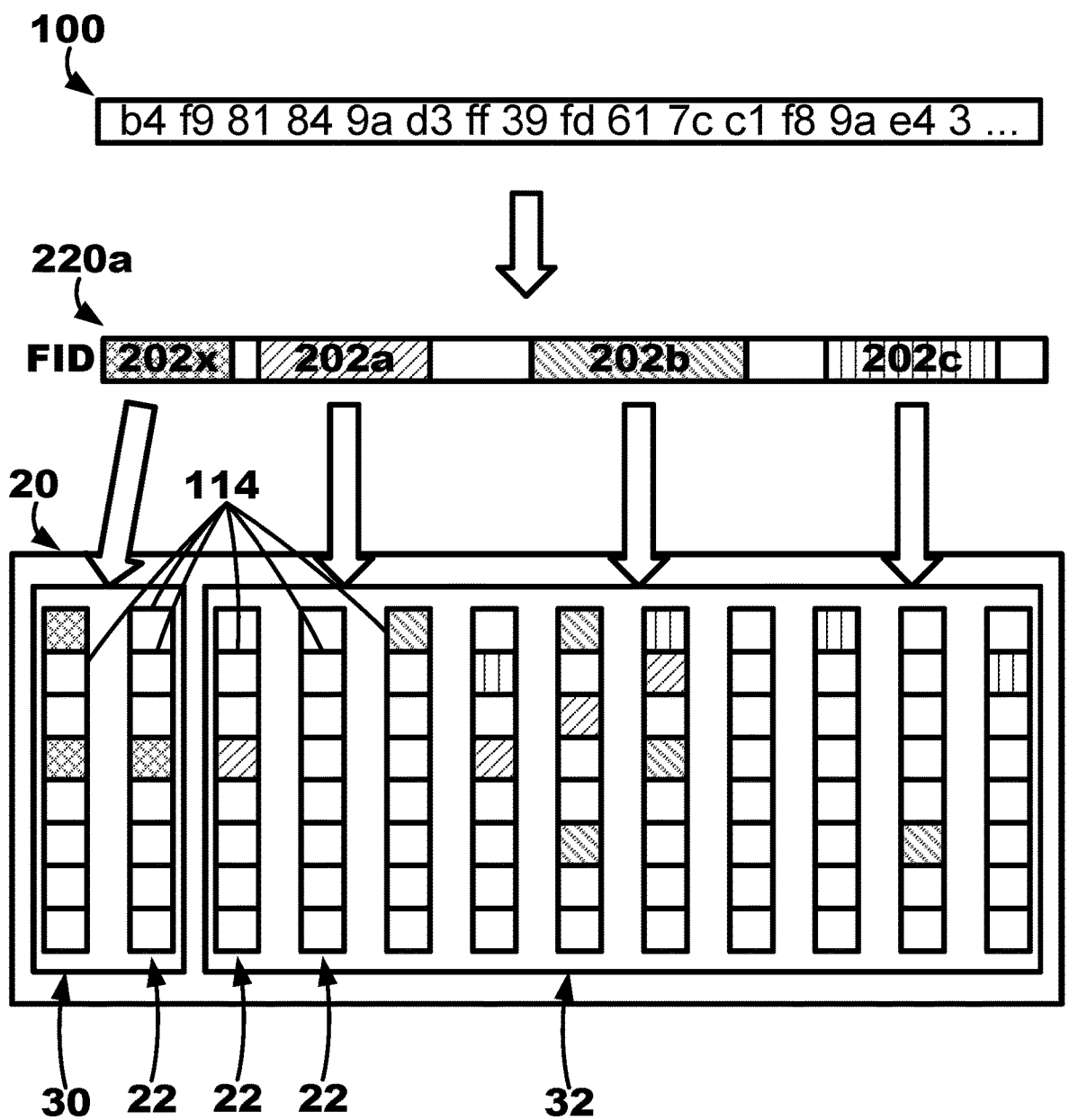
FIG. 3 is a diagrammatic representation of an exemplary layout corresponding to a data object for use with an exemplary system such as, e.g., depicted in FIG. 1.
Figure 4:
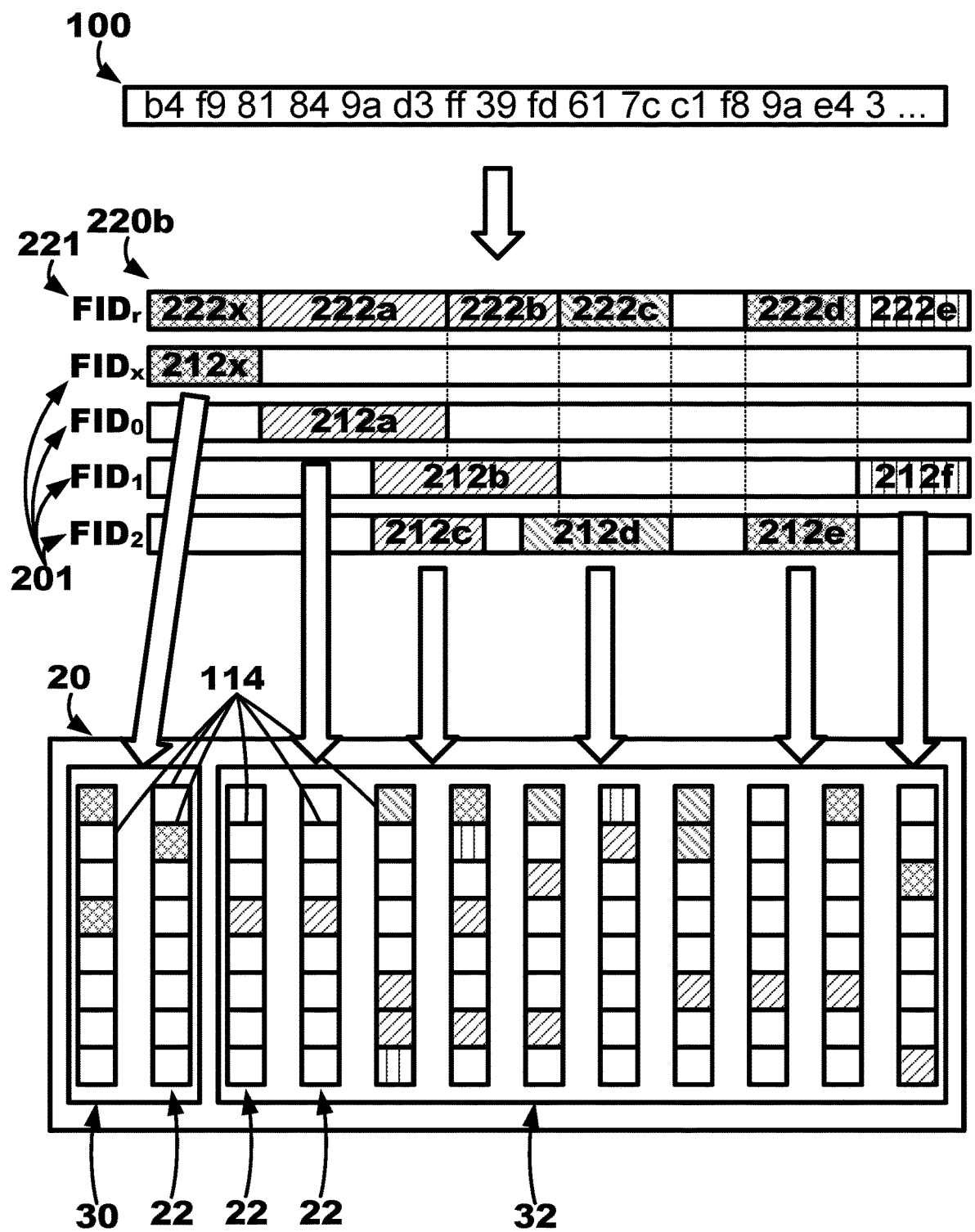
FIG. 4 is a diagrammatic representation of an exemplary composite layout corresponding to a data object for use with an exemplary system such as, e.g., depicted in FIG. 1.

To resolve these issues, the systems, methods, and processes described herein with reference to FIGS. 3-4 utilize an exemplary composite layout, or series of sub-layouts, each describing an arbitrary set of data objects with mapped extents or unmapped extents that are ordered as a "sieve." An unmapped extent may be thought of as a "hole" in the "sieve." Any extent not mapped by an upper sub-layout falls through to the next sub-layout in the sieve. More specifically, an exemplary composite layout may be composed of a set of sub-layouts that occupy a particular ordered rank in the composite layout structure. New writes may be directed to the highest-ranked sub-layout, and reads may be directed to the highest-ranked sub-layout that has a mapped extent for the file range requested. Further, by inserting new sub-layout layers at various ranks, and offering the ability to read and write directly to the sub-layouts, many useful behaviors can be instantiated.

The systems, methods, and processes described herein may use exemplary composite layouts 220 as shown in FIGS. 3-4 that are more useful than the layout 110 of FIG. 2 because, for example, the mapping information of the illustrative composite layouts 220 may to allow for different extents (e.g., portions, chunks, ranges, etc.) of a data object to be efficiently and effectively mapped, and may allow for easily remapping those extents dynamically. In particular, the illustrative composite layouts 220 may include mapping information linking one or more extents of the data object 100 to an alternative storage system such as, for example, a key-value storage system. In the particular example depicted in FIGS. 3-4, the illustrative composite layouts 220 may include mapping information linking a first extent 202x, 222x of the data object 100 to an alternative storage system such as, for example, a key-value storage system. Although the illustrative composite layouts 220 of FIGS. 3-4 include mapping information linking only the first extent 202x, 222x of the data object 100 to an alternative storage system, is to be understood the illustrative composite layouts 220 may include mapping information linking any extent of the data object 100 to an alternative storage system (e.g., based on the criticality of the extents, frequency of access of the extents, etc.). Further, it may be generally described that the illustrative composite layouts 220 of the systems, methods, and processes may enable a series of desirable capabilities that can be implemented simply and efficiently, rendering a file system that is more capable, efficient, and stable.

Similar to the layout 110 as shown in FIG. 2, the exemplary composite layout 220a in FIG. 3 may correspond to the data object 100 stored on the one or more storage apparatuses 22 and may include mapping information linking the data object 100 to one or more locations 114 on the on the one or more storage apparatuses 22. Different than the layout 110 of FIG. 2, the illustrative composite layout 220a may include mapping information for linking the first extent 202x of the data object 100 to one or more locations on the one or more storage apparatuses 22 in a first storage system 30 such as, e.g., a key-value storage system.

The data storage system 20 of FIGS. 3-4 may include two or more different storage systems or schemes. As shown, the data storage system 20 includes two different storage systems or schemes, namely the first storage system 30 and a second or another storage system 32. The second storage system 32 may be any other type of storage system other than the first storage system 30. In other words, the second storage system 32 is different than the first storage system 30. In at least one embodiment, the second storage system 32 is any type of storage system other than a key-value storage system (which may be the first storage system 30). In at least one embodiment, the second storage system 32 may be described as being a traditional storage system such as an object storage system. For example, the second storage system 32 may be an EXT4 file system. Further, for example, the second storage system 32 may be a traditional distributed data storage system that is optimizes for storing large data objects such as traditional file storage systems like the LUSTRE file system or traditional object storage systems like a SWIFT ring.

Additionally, the first storage system 30 and the second storage system 32 may utilize different types, or kinds, of storage apparatus 22 which may vary in size, speed, reliability, etc. The first storage system 30 may include storage apparatuses 22 that are quicker (e.g., faster reads and/or writes) than the second storage system 32. For example, the first storage system 30 may include, or utilize, solid state drives that are quicker than the spinning-disc drives of the second storage system 32. Further, the first storage system 30 may include storage apparatuses 22 that are more reliable (e.g., include more redundancy, better error correction, etc.) than the second storage system 32.

As described herein, the first storage system 30 may be a key-value storage system. An illustrative key-value storage system may automatically use log-structured merge tree and/or streaming b-tree mechanisms for efficient packing of small data. In one or more embodiments, a key-value storage system may be configured to store key-value pairs, where the key of each pair provides mapping, or location, information to find the value corresponding to the key within the key-value storage system.

The key-value storage may include a single index of keys or a plurality (or collection) of indices of keys. Each key may identify the location of corresponding value within the key-value storage system. Thus, the key may be usable to find an extent within the key-value storage system. In the illustrative systems and methods described herein, the corresponding "value" to the "key" in a key-value storage system would be the first extent 202x of the file object 100 according to the composite layout 220a thereof.

In at least one embodiment, the "key" for each extent may be stored in the key-value storage system as follows:
{FID|offset|length}.
The FID of the key is the object or file identifier, the offset is the distance from the start location or address, and the length is length of the value. The "value" of the key-value pair is the data for the extent, which may be identified using the key.

In the single index of keys example, the input to find an extent in the key-value storage would be the concatenation of the FID and the offset. In the plurality of indices of keys example, the input to find an extent in the key-value storage would be the FID that identifies the index of the plurality of indices and the offset within that index.

In at least one embodiment, all keys for all small files, or heads, may be stored in a single "index," which is a logical set of key-value pairs. Prefix matching and iteration may be able to fetch all key-value pairs containing data in the first extent or file head. Further, during b-tree merge, garbage collection of overlapping key-value pairs may be possible, and also snapshots should not prevent them.

The size of the first extent 202x of the data object 100 may vary depending on the block sizes of the storage system 20. In at least one embodiment, the first extent 202x is 4096 bytes (in other words, a 4K block). The first extent 202x may be less than 4096 bytes such as, e.g., 512 bytes.

As described herein, the initial, or first, mapping information linking the first extent 202x of the data object 100 to one or more locations on the one or more storage apparatuses 22 in the first storage system 30 such as, e.g., a key-value storage system. The remaining mapping information links the other extents 202a, 202b, 202c of the data object 100 to one or more locations on the one or more storage apparatuses 22 in the second storage system 32 where the extents 202a, 202b, 202c of the data object 100 are stored. Again, as described herein, although the mapping information of the composite layout 202a of FIG. 3 only links the first extent 202x of the data object 100 to one or more locations on the one or more storage apparatuses 22 in the first storage system 30, it is to be understood that the composite layout 202a may include mapping information linking more than the first extent 202x such as one or more of the extents 202a, 202b, 202c to one or more locations on the one or more storage apparatuses 22 in the first storage system 30.

Additionally, another illustrative layout 220b is depicted in FIG. 4 that may include a plurality of sub-layouts 201 ranked from a lowest priority to a highest priority. As shown, each of the sub-layouts 201 may include the handle, or descriptor, "FID" and a numeral in subscript to indicate the priority level of the sub-layout 201. The subscript numeral may indicate priority in descending order with the highest priority sub-layout 201 having handle of "$FID_0$" and the lower priority sub-layouts having a handle with a larger numeral subscript. In this example, the lowest priority sub-layout 201 includes the handle "$FID_2$," which indicates a lower priority than sub-layouts 201 "$FID_0$" and "$FID_1$." In other words, the plurality of sub-layouts 201 may be tiered to form a cascading sieve with the higher priority sub-layouts 201 located in a higher tier than the lower priority sub-layouts 201.

Although the illustrative composite layout 220b depicted in FIG. 4 includes three sub-layouts 201, it is to be understood that the exemplary composite layout 220b is dynamic such that it may increase or decrease the amount, or number, of sub-layouts 201 to provide the functionality described further herein. More specifically, new sub-layouts 201 may further be added at deliberate, or selected, priorities within the composite layout 220b, for example, as higher or lower than existing sub-layouts 201. Further, the ability of the composite layout 220b to include, or have, multiple sub-layouts 201 may allow overlapping extent ranges, which may also be useful to provide the functionality described herein.

Each of the sub-layouts 201 may include mapping information linking the one or more extents 222a, 222b, 222c, 222d, 222e of the data object 100 to one or more locations 114 on the one or more storage apparatuses 22 where the one or more extents 222a, 222b, 222c, 222d, 222e of the data object 100 are stored. Similar to the layout 110, each sub-layout 201 corresponds to the data object 100 such that the sub-layout 201 extends from a left end to a right end representing the range of bytes within the data object 100 with the left end representing the beginning of the data object 100 and the right end representing the end of the data object 100. The extents 212 of the sub-layouts 201 are depicted diagrammatically using hatching within the sub-layouts 201 to indicate which extents, or ranges, of the data object 100 have corresponding mapping information in the sub-layouts 201 to link the extents, or ranges, to locations 114 on the one or more storage apparatuses 20. In other words, the hatched extents 212, or areas, of the sub-layouts 201 indicate that mapping information exists to link the extents 212 to the locations 114 on the one or more storage apparatuses 22.

Additionally, the plurality of sub-layouts 201 includes sub-layout 201 $FID_x$ that includes mapping information for linking the first extent 212x of the data object 100 to one or more locations on the one or more storage apparatuses 22 in a first storage system 30 such as, e.g., a key-value storage system, similar to the illustrative layout 220a. Since the extents stored in the first storage system 30 are located in a single sub-layout 201 $FID_x$, then the systems, methods, and processes may be able to determine whether the extent is located in the first storage system 30 based on the FID alone. In other words, there may be no co-mingling of sub-layouts 201 between sub-layouts directing extents to the first storage system 30 such as sub-layout 201 $FID_x$ and sub-layouts directing extents to the second storage system 32 such as the remaining sub-layouts 201 $FID_0$, $FID_1$, $FID_2$.

Further, in one or more embodiments, the mapping information for the first extent 212x may be stored in the highest priority sub-layout 201. Further, in one or more embodiments, the layout function may include an exception for the first extent 222x such that the layout function directs and reads or writes of the first extent to the first storage system 30. Thus, the exceptional mapping information linking the first extent 222x to the first storage system 30 may be used in conjunction with the composite layout 220b including a plurality of sub-layouts 201 as either a sub-layout 201 $FID_x$ itself as depicted in FIG. 4 or as mapping process in the layout function.

The exemplary composite layout 220b may be described as a resultant layout $FID_r$ 221 that is the result of the combination of the sub-layouts 201. Although the resultant layout $FID_r$ 221 is depicted in FIG. 4, it is to be understood that the resultant layout $FID_r$ 221 is depicted primarily for use in describing the exemplary systems, methods, and processes described herein. The resultant layout $FID_r$ 221 may be provided based on the mapping information that is present for a particular extent in the highest priority sub-layout 201 that includes mapping information for the particular extent. In other words, when looking for mapping information for a particular extent or range, the highest priority sub-layout 201 may be examined, and if no mapping information exists for the extent or range, then the next the highest priority sub-layout 201 may be examined and so on.

Moving from left to right (e.g., from the beginning to the end of the data object 100) in the resultant layout $FID_x$ 221 in FIG. 4, mapping information for the first extent 222x is provided by the mapping information for the extent 212x of the sub-layout 201 $FID_x$ and mapping information for the second extent 222a is provided by the mapping information for the extent 212a of the sub-layout 201 $FID_0$, which may be the highest priority sub-layout 201 including mapping information for the second extent 222a. As shown, the sub-layouts 201 $FID_1$ and $FID_2$ also includes mapping information in extents 212b and 212c, respectively, that correspond to a portion of the second extent 222a of the resultant layout $FID_r$ 221. However, the sub-layout 201 $FID_0$ has higher priority than each of the sub-layouts 201 $FID_1$ and $FID_2$, and thus, the mapping information of the sub-layout 201 $FID_0$ supersedes that mapping information in the sub-layouts 201 $FID_1$ and $FID_2$. In other words, the mapping information of sub-layouts 201 $FID_0$, $FID_1$, and $FID_2$ overlaps at extent 222a, and thus, the mapping information for the higher priority sub-layout 201, which is sub-layout 201 $FID_0$, takes precedence over lower priority sub-layouts 201.

Further, mapping information for the third extent 222b of the resultant layout $FID_r$ 221 is provided by a portion of the mapping information for the extent 212b of the sub-layout 201 $FID_1$, which is the highest priority sub-layout 201 including mapping information for the third extent 222b. As shown, the sub-layout 201 $FID_2$ also includes mapping information in extent 212c that corresponds to a portion of the third extent 222b of the resultant layout $FID_r$ 221. However, the sub-layout 201 $FID_1$ has higher priority than the sub-layout 201 $FID_2$, and thus, the mapping information of the sub-layout 201 $FID_1$ supersedes that mapping information in the sub-layout 201 $FID_2$. In other words, the mapping information of sub-layouts 201 $FID_1$ and $FID_2$ overlaps at extent 222b, and thus, the mapping information for the higher priority sub-layout 201, which is sub-layout 201 $FID_1$, takes precedence over lower priority sub-layouts 201.

Next, mapping information for the fourth extent 222c of the resultant layout $FID_r$ 221 is provided by a portion of the mapping information for the extent 212d of the sub-layout 201 $FID_2$, the lowest priority sub-layout, because no higher priority sub-layouts 201 of the composite layout 220b include mapping information for the extent 222c of the resultant layout $FID_r$ 221. Lastly, according to the priority functionality and logic described herein, the mapping information for the fifth extent 222d and the sixth extent 222e of the resultant layout $FID_r$ 221 are provided by mapping information for the extent 212e of the sub-layout 201 $FID_2$ and by the mapping information of the extent 212f of the sub-layout 201 $FID_1$, respectively.

Additional features enabled by the composite layouts 220 of the illustrative systems, methods, and processes may include tiering/information lifecycle management (ILM), data locality, fault recovery, and data rebalance such as described in U.S. Pat. App. Pub. No. 2018/0232282 A1 entitled "Data Storage Composite Layouts for Data Objects" and published on Aug. 16, 2018, which is incorporated herein by reference in its entirety.

Figure 5:
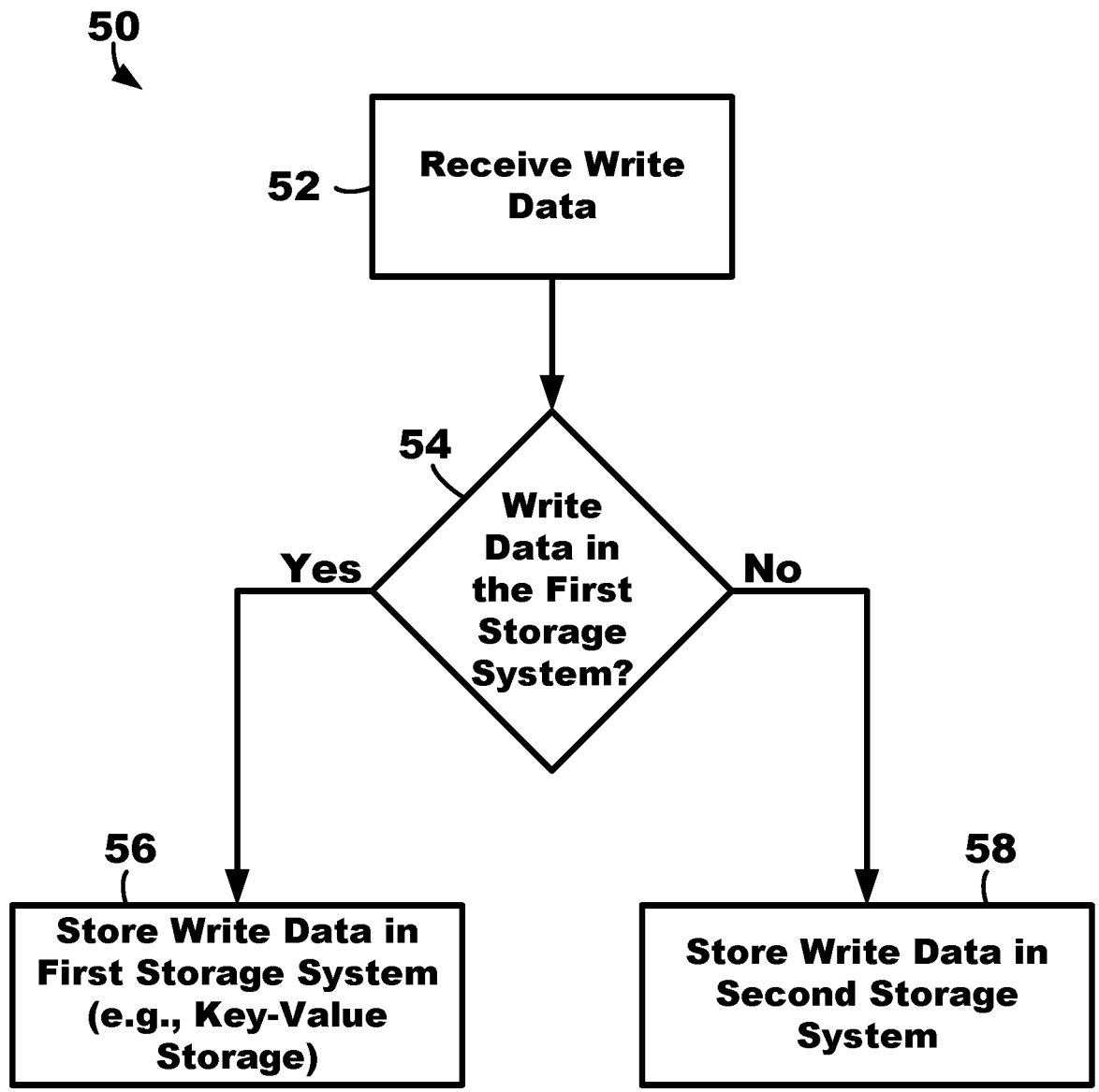
FIG. 5 is a flow diagram of an illustrative write method using the illustrative composite layouts of FIGS. 3-4.

An illustrative write method 50 using the illustrative composite layouts of FIGS. 3-4 is depicted in FIG. 5. The method 50 may include receiving write data 52 to be written to an existing data object stored in the data storage system 20 and determining whether the write data is in the first storage system 54. If the write data is located in the first storage system, then the method 50 may store the write data in the first storage system such as, e.g. a key-value storage system 56. Conversely, if the write data is not located in the first storage system, then the method 50 may store the write data in the second storage system 58.

Figure 6:
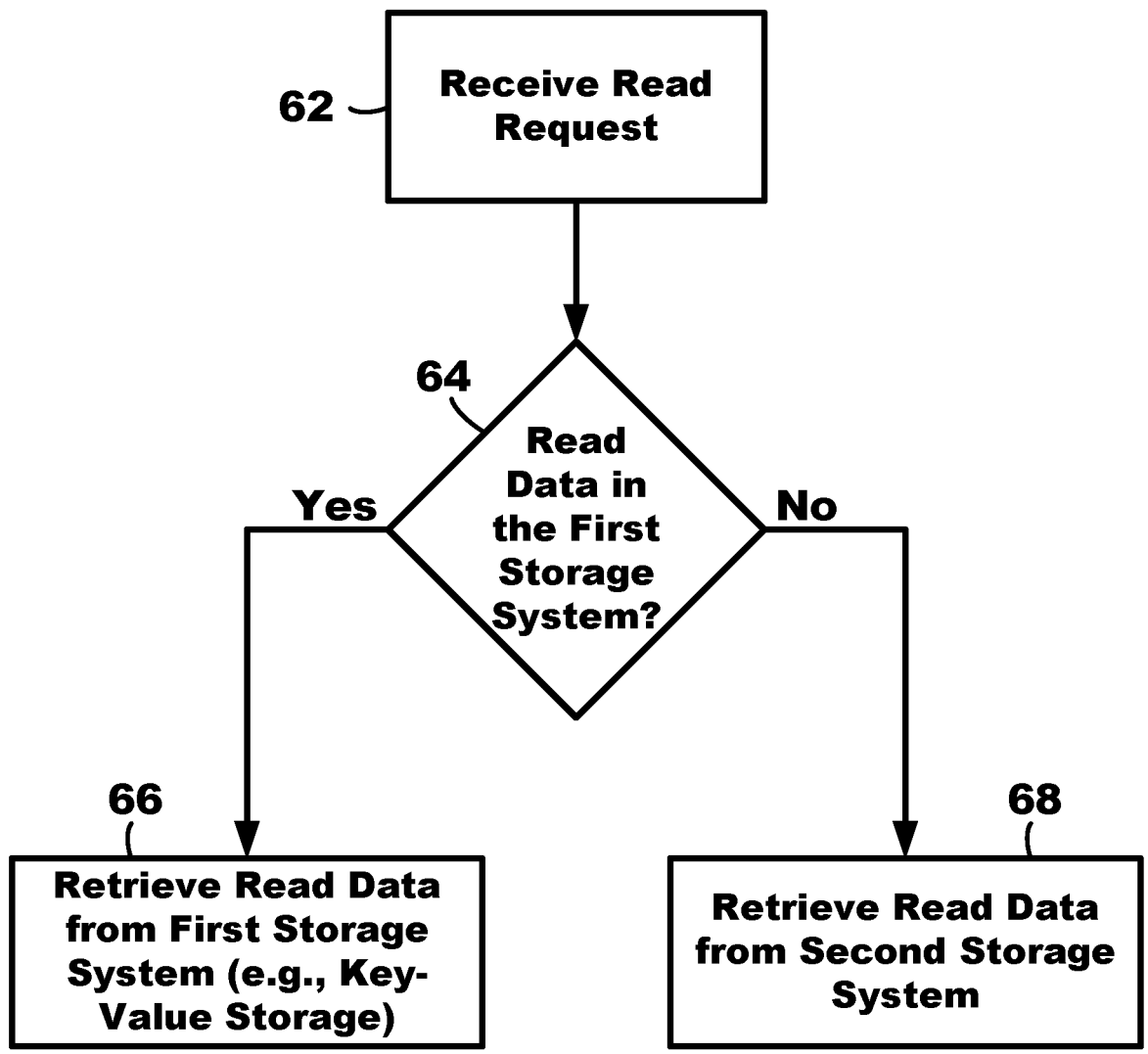
FIG. 6 is a flow diagram of an illustrative read method using the illustrative composite layouts of FIGS. 3-4.

An illustrative read method 60 using the illustrative composite layouts of FIGS. 3-4 is depicted in FIG. 6. The method 60 may include receiving a read request for read data 62 of an existing data object stored in the data storage system 20 and determining whether the read data is in the first storage system 64. If the read data is located in the first storage system, then the method 60 may retrieve the read data from the first storage system such as, e.g. a key-value storage system 66. Conversely, if the read data is not located in the first storage system, then the method 60 may retrieve the read data from the second storage system 68.

It will be apparent to one skilled in the art that elements or processes from one embodiment may be used in combination with elements or processes of the other embodiments, and that the possible embodiments of such systems, apparatus, devices, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

The methods and/or techniques described in this disclosure, including those attributed to the computing apparatuses of the host and/or file system, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programs. The term "controller," "module," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, the like, or any combination thereof. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A system comprising:
   one or more data storage apparatuses to store one or more data objects; and
   computing apparatus comprising one or more processors and operably coupled to the one or more data storage apparatuses, the computing apparatus configured to:
      maintain, using the one or more data storage apparatuses, a key-value storage system and another storage system different than the key-value storage system; and
      provide a composite layout for each data object stored on the one or more data storage apparatuses and comprising mapping information linking one or more extents of each data object to one or more locations on the one or more data storage apparatuses where the one or more extents of the data object are stored, wherein at least one extent of the one or more extents of each data object is stored in the key-value storage system and at least another extent of the one or more extents of each data object is stored in the another storage system, wherein the composite layout comprises a plurality of sub-layouts from a lowest priority to a highest priority, each sub-layout comprising mapping information linking one or more extents of the data object to one or more locations on the storage apparatuses where the extents of the data object are stored, wherein the mapping information of at least one sub-layout of the plurality of sub-layouts indicates whether one or more extents are stored in the key-value storage system.

2. The system of claim 1, wherein the at least one extent stored in the key-value storage system comprises a first extent of each data object.

3. The system of claim 1, wherein the at least one extent stored in the key-value storage system is less than or equal to 4096 bytes.

4. The system of claim 1, wherein the key-value storage system uses a b-tree to store key-value pairs.

5. The system of claim 1, wherein the key-value storage system comprises a plurality of indices of key-value pairs, wherein each of the indices of key-value pairs comprises at least one key usable to find the at least one extent within the key-value storage system.

6. The system of claim 1, wherein the computing apparatus is further configured to:
receive a write data object to be stored on the one or more data storage apparatuses; and
store at least one extent of the write data object in the key-value storage system according to the composite layout.

7. The system of claim 1, wherein the computing apparatus is further configured to:
receive write data to be written to an existing data object of the one or more data objects;
determine whether the write data is to be written to an extent of the existing data object stored in the key-value storage system; and
store the write data in the key-value storage system if it is determined that the write data is to be written to the extent of the existing data object stored in the key-value storage system.

8. The system of claim 1, wherein the computing apparatus is further configured to:
receive a read request for read data of an existing data object of the one or more data objects;
determine whether the read data is to be read from an extent of the existing data object stored in the key-value storage system; and
read the read data from the key-value storage system if it is determined that the read data is located in the extent of the existing data object stored in the key-value storage system.

9. The system of claim 1, wherein the one or more data storage apparatuses comprises one or more solid state drives, wherein the key-value storage system uses the one or more solid state drives.

10. A method comprising:
maintaining, using a one or more data storage apparatuses to store one or more data objects, a key-value storage system and another storage system different than the key-value storage system; and
providing a composite layout for each data object stored on the one or more data storage apparatuses and comprising mapping information linking one or more extents of each data object to one or more locations on the one or more data storage apparatuses where the one or more extents of the data object are stored, wherein at least one extent of the one or more extents of each data object is stored in the key-value storage system and at least another extent of the one or more extents of each data object is stored in the another storage system, wherein the composite layout comprises a plurality of sub-layouts from a lowest priority to a highest priority, each sub-layout comprising mapping information linking one or more extents of the data object to one or more locations on the storage apparatuses where the extents of the data object are stored, wherein the mapping information of at least one sub-layout of the plurality of sub-layouts indicates whether one or more extents of the data object are stored in the key-value storage system.

11. The method of claim 10, wherein the at least one extent stored in the key-value storage system comprises a first extent of each data object.

12. The method of claim 10, wherein the at least one extent stored in the key-value storage system is less than or equal to 4096 bytes.

13. The method of claim 10, wherein the key-value storage system uses a b-tree to store key-value pairs.

14. The method of claim 10, wherein the key-value storage system comprises a plurality of indices of key-value pairs, wherein each of the indices of key-value pairs comprises at least one key usable to find the at least one extent within the key-value storage system.

15. The method of claim 10, the method further comprising:
receiving a write data object to be stored on the one or more data storage apparatuses; and
storing at least one extent of the write data object in the key-value storage system according to the composite layout.

16. The method of claim 10, the method further comprising:
receiving write data to be written to an existing data object of the one or more data objects;
determining whether the write data is to be written to an extent of the existing data object stored in the key-value storage system; and
storing the write data in the key-value storage system if it is determined that the write data is to be written to the extent of the existing data object stored in the key-value storage system.

17. The method of claim 10, the method further comprising:
receiving a read request for read data of an existing data object of the one or more data objects;
determining whether the read data is to be read from an extent of the existing data object stored in the key-value storage system; and
reading the read data from the key-value storage system if it is determined that the read data is located in the extent of the existing data object stored in the key-value storage system.

18. The method of claim 10, wherein the one or more data storage apparatuses comprises one or more solid state drives, wherein the key-value storage system uses the one or more solid state drives.

19. A composite layout corresponding to a data object describing one or more locations of one or more extents of the data object on one or more storage apparatuses comprising:
a plurality of sub-layouts ranked from a lowest priority to a highest priority, each sub-layout comprising mapping information linking one or more extents of the data object to one or more locations on the storage apparatuses where the one or more extents of the data object are stored, wherein at least one extent of the one or more extents of each data object is stored in a key-value storage system and at least another extent of the one or more extents of each data object is stored in another storage system different than the key-value storage system.

20. The composite layout of claim 19, wherein the mapping information of at least one sub-layout of the plurality of sub-layouts indicates whether one or more extents of the data object are stored in the key-value storage system.

* * * * *